July 1, 1958 C. H. HEUER 2,841,639

COLOR TELEVISION

Filed May 26, 1953 2 Sheets-Sheet 1

CHARLES H. HEUER
*INVENTOR.*

BY Francis W. Crotty

HIS ATTORNEY.

July 1, 1958 C. H. HEUER 2,841,639

COLOR TELEVISION

Filed May 26, 1953 2 Sheets-Sheet 2

CHARLES H. HEUER
*INVENTOR.*

BY Francis W. Crotty

HIS ATTORNEY.

United States Patent Office 2,841,639

Patented July 1, 1958

2,841,639

COLOR TELEVISION

Charles H. Heuer, Glencoe, Ill., assignor to Zenith Radio Corporation, a corporation of Illinois Application May 26, 1953, Serial No. 357,591

5 Claims. (Cl. 178—5.4)

This invention pertains to color television and more particularly to color television receivers and to new and improved signal-translating circuits for use in such receivers. Although the invention is useful in any color television system in which color-synchronizing signal components are periodically interspersed with color picture signal components, it is especially valuable in a receiver adapted for use in the color television system proposed by the National Television System Committee, and will be described in that environment.

In the color television system proposed by the National Television System Committee, commonly referred to as the NTSC system, a color image is resolved into three components including a luminance or monochrome signal and two color difference signals. The luminance signal is transmitted over a broadcast range of frequencies in a manner generally corresponding to that employed for standard commercial black and white television. The color difference signals are modulated upon a color subcarrier having a frequency equal to an odd harmonic of one-half the line-scanning frequency of the system to form a carrier color signal which is interleaved with the luminance signal for simultaneous transmission. In order to utilize the color picture signal resulting from the combination of the luminance and carrier color signals at a receiver, it is necessary to develop a color carrier reference signal comprising a continuous oscillation wave of stable phase. This color reference signal enables the receiver to demodulate the carrier color signal and to develop the color difference signals. At present, it is proposed to transmit a color-synchronizing signal as a burst of oscillations occurring during each horizontal blanking interval and immediately following a horizontal scanning-synchronizing pulse of the same general type as that currently utilized in monochrome transmission. The color burst is employed to regulate the phase and frequency of the locally generated color reference signal to permit intelligible reproduction of the transmitted color information.

The National Television System Committee has adopted and approved standardized working definitions for use in describing a color television system ("Electrical Engineering," December 1952, pp. 1120–1121); the definitions for those terms most frequently used in this specification and in the appended claims are as follows:

*Carrier color signal.*—The sidebands of the modulated color subcarrier (plus the color subcarrier, if not suppressed) which are added to the monochrome signal to convey color information.

*Color burst or color sync signal.*—That portion of the composite color signal comprising the few sine-wave cycles of color subcarrier frequency (and the color burst pedestal, if present) which is added to the horizontal pedestal for synchronizing the color carrier reference.

*Color carrier reference or color reference signal.*—A continuous signal having the same frequency as the color subcarrier and having fixed phase with respect to the color burst. This signal is used for the purposes of modulation at the transmitter and demodulation at the receiver.

*Color difference signal.*—An electric signal which, when added to the monochrome signal, produces a signal representative of one of the tristimulus values (with respect to a stated set of primaries) of the transmitted color.

*Color picture signal.*—The electric signal which represents color information, consisting of a monochrome component plus a subcarrier modulated with color information, excluding synchronizing signals.

*Composite color signal.*—The color picture including blanking and all synchronizing signals.

*Luminance signal.*—A signal wave which is intended to have exclusive control of luminance picture.

In conventional receivers, the chrominance information or carrier color signal is applied to the color demodulating system by means of circuits which also translate the color sync signal. As a result, during retrace intervals, the demodulators often develop spurious color signals which are supplied to the receiver image reproducer and lead to undesirable effects in the image. In addition, noise superimposed upon the color sync signal may cause disturbances in the D. C. insertion circuits normally utilized to couple the demodulators to a color image reproducer. Furthermore, since the color sync signal has a frequency which lies within the range of frequencies employed to convey video information, it is somewhat difficult to derive the color sync signal as a separate synchronizing signal for use in controlling the operation of the color reference generator.

It is an object of the invention, therefore, to provide a signal translating circuit for the chrominance channel of a color television receiver which separates the color picture signal components and synchronizing-signal components from a composite color signal and supplies these two types of components as independent signals.

It is an additional object of the invention to provide a new and improved color television receiver in which spurious effects in a reproduced image caused by translation of color sync signals through the chrominance channel of the receiver are avoided.

It is a further object of the invention to provide a new and improved color television receiver in which the color sync signal is separated from the composite color signal on a time-division basis independent of amplitude variations in the received signal.

It is another object of the invention to provide a time-division signal-translating circuit for a color television receiver which separates color sync signals from a received composite color signal without materially distorting the color sync signals.

It is a corollary object of the invention to provide a time-division signal-translating circuit for a color television receiver which is simple and expedient to construct and economical to manufacture.

The signal-translating circuit of the invention is adapted for use in a color television receiver which includes means for developing a composite color signal comprising periodically recurring synchronizing-signal components interspersed with color picture signal components. In accordance with the invention, a time-division signal-translating circuit for use in such a receiver comprises an electron-discharge device having means including a cathode for developing a stream of electrons, a pair of output electrodes, and a first control system comprising a control electrode interposed between the cathode and output electrodes to control the intensity of the electron stream. A second control system is associated with the device for normally directing the electron stream toward a selected one of the output electrodes and for directing the stream toward the other of the output electrodes in response to an applied signal. The signal translating circuit further includes means for applying the composite color signal to the first control system to modulate the electron stream and additional means for impressing on the second control system a gating signal in synchronism with and at least equal in duration to the synchronizing-signal components to direct the electron stream toward the aforementioned other output electrode during operating intervals in which the synchronizing components occur in the composite color signal. A first output circuit is coupled to one output electrode of the device to develop a color picture signal and a second output circuit is coupled to the other output electrode to develop a color synchronizing signal.

The features of the present invention which are believed to be novel are set forth with particularity in the appended claims. The organization and manner of operation of the invention, together with further objects and advantages thereof, may best be understood by reference to the following description taken in conjunction with the accompanying drawing, in which:

Figure 2:
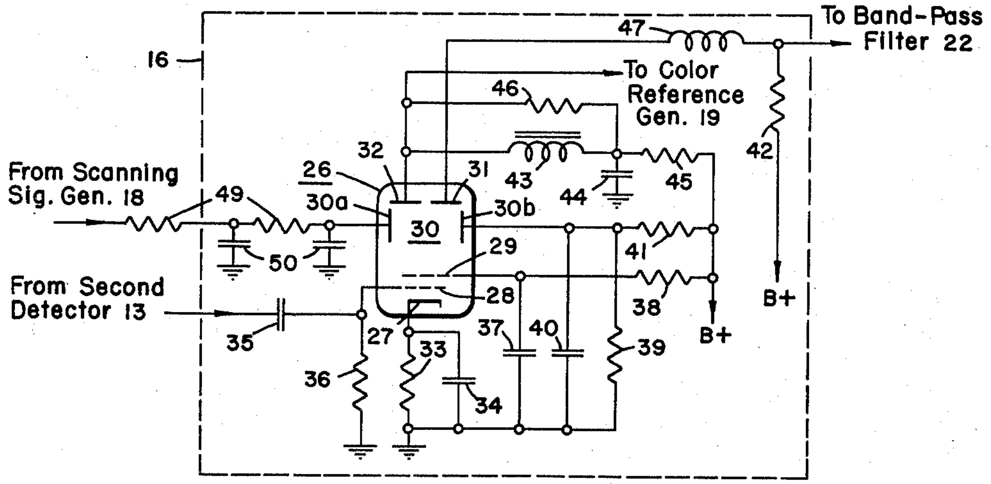
Figure 2 is a schematic diagram of one embodiment of the invention.
Figures 3A, 3B:
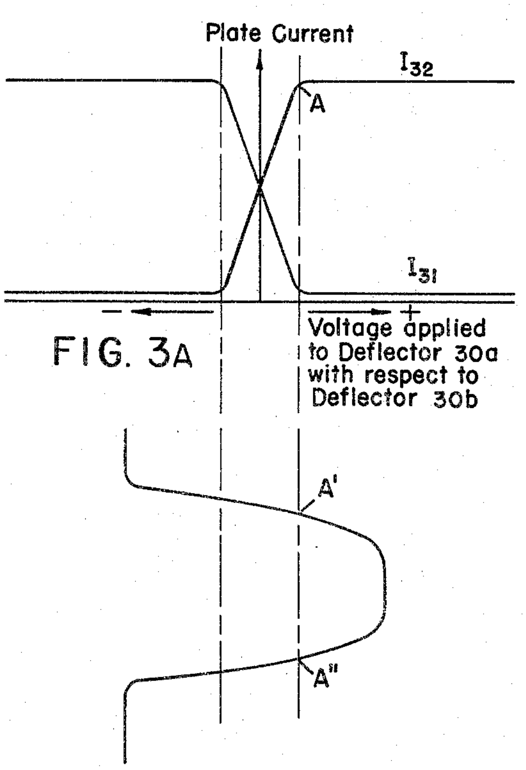
Figure 3C:
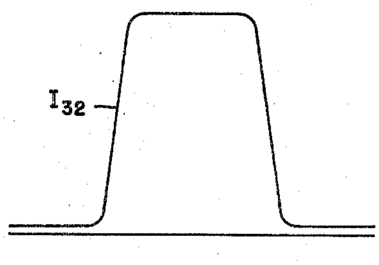

Figures 3A, 3B, and 3C are explanatory diagrams relating to the operational characteristics of a portion of the embodiment of Figure 2.

Figure 1:
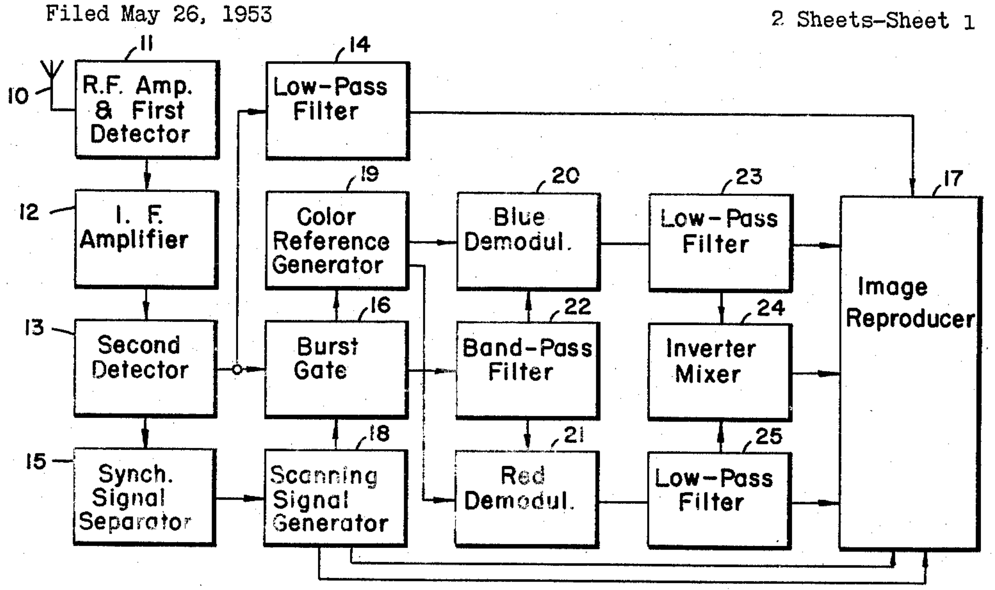
Figure 1 is a block diagram of a color television receiver including a signal-translating circuit constructed in accordance with the invention.

The color television receiver illustrated in the block diagram of Figure 1 comprises an antenna 10 coupled to a radio-frequency amplifier and first detector 11 which is connected in turn to an intermediate-frequency amplifier 12. Amplifier 12 is coupled to a second detector 13, the output of which is coupled to a low-pass filter 14, to a synchronizing-signal separator 15, and to a time-division signal-translating circuit or burst gate 16 constructed in accordance with the invention. Low-pass filter 14 is coupled to an image reproducer 17, which may comprise any of a wide variety of types of color-image reproducers. For example, reproducer 17 may consist of a cathode-ray tube including a tricolor target screen assembly and either a plurality of separate electron guns or a single electron gun in conjunction with a color shift deflection system; the target assembly may be of the shadow-mask type with elemental luminescent target areas of either the dot or the line type. Further description of the image reproducer is deemed unnecessary, since suitable constructions are well known in the art and the details of image tube construction are of no consequence in the regard to the present invention.

Synchronizing-signal separator 15 is coupled to a scanning-signal generator 18 which is connected to image reproducer 17 and to burst gate 16. Gating circuit 16 is coupled to a color reference generator 19, the output of which is coupled to a pair of color demodulators 20 and 21. The gating circuit is further connected to a band-pass filter 22 and filter 22 is coupled to each of demodulators 20 and 21. Color demodulator 20 is coupled through a low-pass filter 23 to image reproducer 17 and to an inverter-mixer circuit 24. Demodulator 21 is similarly coupled to a low-pass filter 25, which in turn is connected to inverter-mixer 24 and to image reproducer 17; the output of circuit 24 is also coupled to the image reproducer.

The color television receiver shown in Figure 1 is conventional in construction in all respects except for the addition of the time-division signal-translating circuit or burst gate 16. Accordingly, a brief description of the overall receiver operation is deemed adequate. A modulated carrier color television signal is intercepted by antenna 10 and applied to circuit 11, wherein it is amplified and heterodyned with a locally generated signal to develop an intermediate-frequency color television signal. The intermediate-frequency signal is amplified in amplifier 12 and applied to second detector 13, which utilizes the intermediate-frequency signal to devlop a composite color signal comprising periodically recurring synchronizing-signal components and interspersed color picture components. The synchronizing-signal components include scanning repetition frequency information as well as bursts of a color sync signal having a frequency equal to the frequency of the color subcarrier signal and having a fixed phase relationship with respect to the color subcarrier signal. The composite color signal developed in second detector 13 is supplied to filter 14, which translates only those portions of the composite color signal generally corresponding to the luminance signal and impresses the luminance signal upon image reproducer 17. The composite color signal is also applied to separator 15, which segregates the synchronizing-signal components and applies those components to generator 18 to control the frequency of locally generated scanning signals which are supplied to reproducer 17.

The composite color signal applied to burst gate 16 is translated alternatively to band-pass filter 22 and to color reference generator 19; signals received from scanning-signal generator 18 control the operation of the gating circuit so that only the synchronizing-signal components of the composite color signal are applied to generator 19, whereas the color picture signal components are coupled to filter 22. In generator 19, the color sync signal or color bursts which form a part of the synchronizing-signal components are utilized to control the generation of a color carrier reference signal which is applied in predetermined phase relation to demodulator 20 and in predetermined different phase relation to demodulator 21. That portion of the color picture signal components comprising chrominance information is translated through filter 22 and applied to demodulators 20 and 21. In demodulator 20, here designated as the "blue" demodulator, the chrominance information supplied from filter 22 is demodulated by means of the color reference signal supplied from generator 19 to develop a first color difference signal B–Y. Similarly, in "red" demodulator 21, the chrominance information is heterodyned with the color carrier reference signal to develop a second color difference signal R–Y. The color difference signals are translated through low-pass filters 23 and 25 and are supplied to image reproducer 17 to control the color content of the reproduced image with respect to two primary colors. In addition, color difference signals R–Y and B–Y are inverted and additively combined in accordance with a predetermined ratio in inverter-mixer 24 to develop a third color difference signal, G–Y, which is applied to reproducer 17 to control the color content of the reproduced image with respect to a third primary color. As indicated above, except for burst gate 16, the structure and operation of all of the circuits illustrated in the block diagram of Figure 1 are entirely conventional; these circuits may be replaced by any other circuits or devices capable of performing the same operations without departing from the scope of the invention.

Figure 2 illustrates a preferred embodiment of the time-division signal-translating circuit of Figure 1. As shown therein, burst gate 16 comprises an electron-discharge device 26 including a cathode 27, a first control system comprising an intensity-control grid 28, an accelerating electrode 29, a second control system 30 comprising a pair of deflection-control electrodes **30*a* and 30*b*, and a pair of output electrodes or anodes 31 and 32. Cathode 27 is connected to a plane of reference potential or ground through a resistor 33 shunted by a bypass capacitor 34. Control electrode 28 is coupled to second detector 13 (Figure 1) through a coupling capacitor 35 and a grid-leak resistor 36, resistor 36 being connected between electrode 28 and ground. Accelerating electrode 29 is bypassed to ground through a capacitor 37 and connected to a source of unidirectional positive operating potential B+ through a resistor 38. Deflection-control electrode 30*a* is coupled to a gating-signal source by means of a phasing network comprising a pair of series-connected resistors 49 and two capacitors 50 connected between resistors 49 and ground; for the embodiment illustrated, the gating signal is supplied from scanning-signal generator 18 of Figure 1. Deflector 30*b* is connected to ground through a filter comprising a resistor 39 and a parallel-connected capacitor 40 and is also connected through a resistor 41** to operating potential source B+.

Anode 31 of device 26 is connected to potential source B+ through an output circuit comprising a peaking coil 47 and a load resistor 42; resistor 42 is also coupled to band-pass filter 22 of Figure 1. Anode 32 is connected to a self-resonant coil 43 tuned to the color subcarrier frequency and bypassed to ground through a decoupling capacitor 44; a decoupling resistor 45 is connected between operating potential source B+ and the junction of coil 43 with capacitor 44. A damping resistor 46 is connected in parallel with coil 43, and the coil is further coupled to color reference generator 19 of Figure 1.

When burst gate 16 is placed in operation, a stream of electrons is projected from cathode 27 toward anodes 31 and 32 of device 26. The electron stream is intensity-modulated by the composite color signal applied to control electrode 28 from second detector 13 and is accelerated by the operating potential impressed upon electrode 29. In the absence of any control signal applied to deflector **30*a*, the biasing potential impressed upon the deflection control system from source B+ directs the electron stream to impinge upon anode 31. Accordingly, the modulated electron stream energizes the output circuit coupled an anode 31 to develop a color picture signal across load resistor 42. Deflector 30*a* is supplied with a gating signal, in synchronism with the synchronizing signal components of the composite color signal, from scanning signal generator 18. The gating signal, which for the illustrated embodiment comprises positive polarity pulses, is utilized by deflection control system 30 to direct the electron stream to impinge exclusively upon anode 32 during operating intervals in which the color synchronizing components occur in the composite color signal. Consequently, during these operating intervals the output circuit coupled to anode 32 is energized and a signal corresponding to the color burst or color sync signal is developed across load impedance 43 and is applied to color reference generator 19** (Figure 1).

The switching action of the deflection control system effects separation of two signals from the composite color signal; one of the derived signals corresponds generally to the color picture signal but includes no color synchronizing components, whereas the other derived signal comprises only synchronizing signal components and does not contain color picture information. In order effectively to prevent the translation of the color-synchronizing signal components to band-pass filter 22, demodulators 20 and 21, and reproducer 17 (Figure 1), it is necessary that the gating signal be at least equal in duration to and overlap in point of time the color burst and, in addition, the gating signal should preferably not be of greater duration than the combined horizontal and color synchronizing-signal components. The horizontal retrace scanning signals normally developed in scanning-signal generator 18 may readily be employed for gating purposes; the phase relationship of the horizontal retrace signals with respect to the color synchronizing components is adjusted by means of phasing network 49, 50 to achieve the requisite time coincidence.

The generalized operating characteristics of discharge device 26 are illustrated in Figures 3A, 3B and 3C. Figure 3A illustrates the variations in current to anodes 31 and 32 with variation in voltage applied to deflector **30*a* with respect to deflector 30*b*. As indicated, during operating intervals when no gating pulse is present and deflector 30*a* is negative with respect to deflector 30*b*, the current $I_{31}$ received by anode 31 is relatively constant in amplitude and comprises substantially all of the electron stream emitted from cathode 27, whereas the plate current $I_{32}$ is negligible. On the other hand, when deflector 30*a* is driven positive with respect to deflector 30*b*, the situation is reversed and $I_{32}$ is stabilized at an amplitude representative of the entire beam current while $I_{31}$ is reduced to a negligible value. It will be appreciated that the characteristic curves of Figure 3A, as well as those of Figure 3B and 3C, do not illustrate the effect of the modulating signals supplied to electrode 28 of device 26**.

Figure 3B shows, in generalized form, the type of pulse which may be applied to deflection control system 30. When a gating signal of this type is impressed upon the deflection system, the electron stream from cathode 27 is redirected so that it impinges upon anode 32 and no longer supplies an appreciable current to anode 31. The effect of the application to deflection system 30 of the pulse of Figure 3B upon the current drawn by anode 32 is illustrated in Figure 3C. The amplitude of current $I_{32}$ increases rapidly as the voltage of deflector **30*a* with respect of deflector 30*b* changes in a positive direction. However, when this voltage reaches the level indicated by points A and A′ in Figures 3A and 3B respectively, current $I_{32}$ becomes substantially independent of further increases in the positive potential of deflector 30*a* with respect to deflector 30*b*. In effect, the deflection control system clips the gating signal so that after deflector 30*a* is driven beyond a predetermined positive potential with respect to deflector 30*b* the magnitude of the anode current is no longer dependent upon the intensity of the pulse. Consequently, as long as the gating signal exceeds a predetermined potential level for a time interval equal in duration to and in time coincidence with the color-synchronizing components of the composite color signal, the operation of device 26 is substantially independent of the wave-form of the gating signal pulses and the color burst is translated with substantially constant amplitude to the load circuit coupled to anode 32. To insure translation of the complete color burst to the load circuit of anode 32**, it is necessary that the time duration of the gating signal of Figure 3B between points A′ and A″ be at least equal to that of the color burst.

Again referring to Figure 1, it is apparent that burst gate 16 effectively precludes translation of the color sync signals through band-pass filter 22 to demodulators 20 and 21 and therefore avoids any spurious image effects which might be caused by application of the demodulated color sync signals to the color-control elements of image reproducer 17 during retrace intervals. In addition, the burst gate supplies color reference generator 19 with synchronizing information which does not include any video signals and thus facilitates effective control of the phase and frequency of the color reference signal. Furthermore, utilization of a deflection control device of the type generally illustrated by tube 26 of Figure 2 makes it possible to translate the color-synchronizing components to generator 19 without material amplitude distortion.

While a particular embodiment of the present invention has been shown and described, it is apparent that various changes and modefications may be made, and it is therefore contemplated in the appended claims to cover all such changes and modifications as fall within the true spirit and scope of the invention.

I claim:

1. In a color television receiver including means for developing a composite color signal comprising periodically recurring color-synchronizing signal components of predetermined duration and interposed color picture signal components, a time-division signal-translating circuit comprising: an electron-discharge device comprising means including a cathode for developing a stream of electrons, a pair of output electrodes, and a first control system comprising a control electrode interposed between said cathode and said output electrodes for controlling the intensity of said electron stream; means including a second control system association with said device for normally directing said electron stream to a selected one of said output electrodes and responsive to an applied signal for directing said electron stream to the other of said output electrodes; means for applying said composite color signal to said first control system to modulate said electron stream; means for impressing on said second control system a gating signal in synchronism with and at least equal in duration to said color-synchronizing signal components to direct said electron stream to said other output electrode during operating intervals in which said synchronizing components occur in said composite color signal; a first output circuit coupled to said one output electrode for developing a color picture signal; and a second output circuit coupled to said other output electrode for developing a color synchronizing signal.

2. In a color television receiver including means for developing a composite color signal comprising periodically recurring color-synchronizing signal components and interposed color picture signal components, a time-division signal-translating circuit comprising: an electron-discharge device comprising means including a cathode for developing a stream of electrons, a pair of output electrodes, a first control electrode system interposed between said cathode and said output electrodes for controlling the intensity of said electron stream; means including a second control electrode system intermediate said first control electrode system and said output electrode for normally directing said electron stream to a selected one of said output electrodes and responsive to an applied signal for directing said electron stream to the other of said output electrodes; means for applying said composite color signal to said first control electrode system to modulate said electron stream; means for impressing on said second control electrode system a gating signal substantially co-extensive in time with said color-synchronizing signal components to direct said electron stream to said other output electrode throughout operating intervals in which said synchronizing components occur in said composite color signal; a first output circuit coupled to said one output electrode for developing a color picture signal; and a second output circuit coupled to said other output electrode for developing a color synchronizing signal.

3. In a color television receiver including means for developing a composite color signal comprising periodically recurring color-synchronizing signal components of predetermined duration and interposed color picture signal components, a time-division signal-translating circuit comprising: an electron-discharge device comprising means including a cathode for developing a stream of electrons, a pair of output electrodes, and a first control system comprising a control electrode interposed between said cathode and said output electrodes for controlling the intensity of said electron stream; means including a second control system associated with said device for normally directing said electron stream to a selected one of said output electrodes and responsive to an applied signal for directing said electron stream to the other of said output electrodes; means for applying said composite color signal to said first control system to modulate said electron stream; means for impressing on said second control system a gating signal in synchronism with and at least equal in duration to said color-synchronizing signal components to direct said electron stream to said other output electrode during operating intervals in which said synchronizing components occur in said composite color signal; an output circuit coupled to said one output electrode for developing a color picture signal; and a resonant output circuit, tuned to the frequency of said color-synchronizing components, coupled to said other output electrode for developing a color synchronizing signal.

4. A color television receiver comprising: receiving circuits for utilizing a received color television signal to develop a composite color signal comprising color-synchronizing signal components of predetermined duration and interposed color picture signal components; an electron-discharge device comprising means including a cathode for developing a stream of electrons, a pair of output electrodes, and a first control system comprising a control electrode interposed between said cathode and said output electrodes for controlling the intensity of said electron stream; means including a second control system associated with said device for normally directing said electron stream to a selected one of said output electrodes and responsive to an applied signal for directing said electron stream to the other of said output electrodes; means coupling said receiving circuits to said first control system for impressing said composite color signal on said first control system to modulate said electron stream; means for applying to said second control system a gating signal in synchronism with and at least equal in duration to said color-synchronizing signal components to direct said electron stream to said other output electrode during operating intervals in which said synchronizing components occur in said composite color signal; a first output circuit coupled to said one output electrode for developing a color picture signal; a second output circuit coupled to said other output electrode for developing a color synchronizing signal; a color reference generator coupled to said second output circuit for utilizing said color synchronizing signal to develop a color carrier reference signal; and a color demodulating system coupled to said color reference generator and to said first output circuit for utilizing said color carrier reference signal and a predetermined portion of said color picture signal to develop a plurality of color difference signals.

5. A color television receiver comprising: receiving circuits for utilizing a received color television signal to develop a composite color signal comprising periodically recurring synchronizing-signal components and interposed color picture signal components; a scanning-signal generator, coupled to said receiving circuits, for developing a scanning signal having a frequency equal to the repetition frequency of said synchronizing-signal components; an electron-discharge device comprising means including a cathode for developing a stream of electrons, a pair of output electrodes, an intensity-control electrode interposed between said cathode and said output electrodes for controlling the intensity of said electron stream; means including a deflection-control electrode system intermediate said intensity-control electrode and said output electrodes for normally directing said electron stream to a selected one of said output electrodes and responsive to an applied signal for directing said electron stream to the other of said output electrodes; means coupling said receiving circuits to said intensity-control electrode for impressing said composite color signal on said intensity-control electrode to modulate said electron stream; means coupled to said scanning-signal generator and said deflection-control electrode system for applying to said deflection-control electrode system a gating signal in synchronism with said synchronizing-signal components to direct said electron stream to said other output electrode during operating intervals in which said synchronizing components occur in said composite color signal; a first output circuit coupled to said one output electrode for developing a color picture signal; a second output circuit coupled to said other output electrode for developing a color synchronizing signal; a color reference generator coupled to said second output circuit for utilizing said color synchronizing signal to develop a color carrier reference signal having predetermined phase and frequency characteristics; and a color demodulating system coupled to said color reference generator and to said first output circuit for utilizing said color carrier reference signal and a predetermined portion of said color picture signal to develop a plurality of color difference signals.

References Cited in the file of this patent

UNITED STATES PATENTS

| | | |
|---|---|---|
| 2,594,380 | Barton | Apr. 29, 1952 |
| 2,606,952 | Valensi | Aug. 12, 1952 |
| 2,653,187 | Tuck | Sept. 22, 1953 |
| 2,684,404 | Adler | July 20, 1954 |
| 2,726,282 | Bigelow | Dec. 6, 1955 |